US012048931B2

(12) United States Patent
Stiess et al.

(10) Patent No.: US 12,048,931 B2
(45) Date of Patent: Jul. 30, 2024

(54) FOLDABLE TRANSPORT CONTAINER AND METHOD FOR ASSEMBLING SUCH A CONTAINER

(71) Applicant: Roche Molecular Systems, Inc., Pleasanton, CA (US)

(72) Inventors: Erich Stiess, Karlsruhe (DE); Sylvia Dobroszczyk, Karlsbad (DE); Jie Pu, Pforzheim (DE); Alexander Gaier, Pforzheim (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 61 days.

(21) Appl. No.: 17/757,664

(22) PCT Filed: Dec. 21, 2020

(86) PCT No.: PCT/EP2020/087465
§ 371 (c)(1),
(2) Date: Jun. 17, 2022

(87) PCT Pub. No.: WO2021/123435
PCT Pub. Date: Jun. 24, 2021

(65) Prior Publication Data

US 2023/0013072 A1 Jan. 19, 2023

(30) Foreign Application Priority Data

Dec. 20, 2019 (EP) .................................... 19218438

(51) Int. Cl.
*B65D 5/20* (2006.01)
*B01L 9/00* (2006.01)
(Continued)

(52) U.S. Cl.
CPC ............ *B01L 9/523* (2013.01); *B31B 50/262* (2017.08); *B65D 5/2052* (2013.01); *B65D 5/301* (2013.01);
(Continued)

(58) Field of Classification Search
CPC .. B01L 9/523; B01L 2200/12; B01L 2200/18; B01L 2300/126; B01L 2200/185;
(Continued)

(56) References Cited

U.S. PATENT DOCUMENTS 4,399,939 A * 8/1983 Tunick .............. B65D 5/46128 206/521.1
6,036,085 A 3/2000 Tsao
(Continued)

FOREIGN PATENT DOCUMENTS

EP 2301853 A1 3/2011

OTHER PUBLICATIONS

International Search Report and written opinion for PCT/EP2020/087465, Filed Dec. 21, 2021. Mailed Mar. 31, 2021.

*Primary Examiner* — Christopher R Demeree
(74) *Attorney, Agent, or Firm* — Maneesh Gupta

(57) ABSTRACT

The present invention is directed to a foldable transport container suitable to receive and hold multiple plates with samples in it. The container is comfortable to load, transport and unload. The invention also relates to a strip of material for providing such a foldable transport container. Finally the invention relates to a method for assembling such a foldable container.

14 Claims, 3 Drawing Sheets

(51) Int. Cl.
*B31B 50/26* (2017.01)
*B65D 5/30* (2006.01)
*B65D 5/42* (2006.01)
*B65D 5/46* (2006.01)
*B31B 120/30* (2017.01)

(52) U.S. Cl.
CPC ......... *B65D 5/4204* (2013.01); *B65D 5/4212* (2013.01); *B65D 5/46128* (2013.01); *B65D 5/4616* (2013.01); *B01L 2200/12* (2013.01); *B01L 2200/18* (2013.01); *B01L 2300/126* (2013.01); *B31B 2120/302* (2017.08)

(58) Field of Classification Search
CPC ........... B01L 2300/0829; B31B 50/262; B31B 2120/302; B65D 5/2052; B65D 5/301; B65D 5/4204; B65D 5/4212; B65D 5/46128; B65D 5/4616; B65D 5/46096; B65D 5/545; B65D 2571/0045; A45F 5/00
USPC ...... 229/117.13, 117.14, 122, 161, 137, 172, 229/190; 206/427, 196; 220/810; 53/461
See application file for complete search history.

(56) References Cited

U.S. PATENT DOCUMENTS

| | | | | | |
|---|---|---|---|---|---|
| 6,581,823 | B1 * | 6/2003 | De Beck | B65D 5/6664 229/117.14 |
| D578,876 | S * | 10/2008 | Ambelang | D9/418 |
| 7,591,496 | B1 * | 9/2009 | De Beck | A45C 11/20 294/152 |
| D951,767 | S * | 5/2022 | Sill | D9/418 |
| 11,731,802 | B2 * | 8/2023 | Trasacco | B65D 5/5028 206/223 |
| 2011/0210031 | A1 | 9/2011 | Shaw | |

* cited by examiner

FOLDABLE TRANSPORT CONTAINER AND METHOD FOR ASSEMBLING SUCH A CONTAINER

CROSS-REFERENCE TO RELATED APPLICATIONS

The present patent application is a US National Stage Application filed under 35 U.S.C. § 371 of PCT/EP2020/087465, filed Dec. 21, 2020, which claims priority to European Patent Application No. EP19218438, filed Dec. 20, 2019. The entire contents of each of these applications are incorporated herein by reference for all purposes.

TECHNICAL FIELD

Generally, the present invention relates to the handling of samples within a laboratory. For many tests and procedures biological or chemical samples have to be transported from one station in a laboratory to another. Sometimes samples also have to be transported from one laboratory to another laboratory in another location.

In particular, the present invention is directed to a foldable transport container for a stack of plates placed inside the transport container. In many cases biological or chemical samples are arranged in plates which contain multiple containers for samples. The invention is directed to simplify the handling for a stack of such plates containing samples.

In other words, the present invention relates to a foldable transport container suitable to receive and hold multiple plates with samples in it. The container is comfortable to load, transport and unload. The invention also relates to a strip of material for providing such a foldable transport container. Finally the invention relates to a method for assembling a foldable container.

BACKGROUND

For some tests performed in a laboratory a high number of samples have to be organized and handled. A common way to arrange and handle such a high number of samples is the use of plates or microplates, containing multiple vessels for some parts arranged in a matrix pattern. Such plates or microplates are flat plates with multiple vessels or wells used as small liquid containing test vessels. Especially microplates have become a standard tool in analytic research and clinical diagnostic testing. Microplates typically contain a number of vessels, for example 6, 12, 24, 48, 96, 384 or 1536 vessels arranged in a rectangular matrix. For some tests a higher number of test samples is required so that multiple plates or microplates have to be handled for one test. It is essential that the plates containing samples for one test stay together and do not get mixed up with samples from other tests. Usually laboratory work for one test is done sequentially at different stations in the laboratory. Therefore the samples have to be transported within the laboratory from one station to another. Tests regarding DNA analyzes are such laboratory tests requiring a multitude of test samples.

It is essential for many biological, biochemical, diagnostic or therapeutic applications to be able to accurately determine the amount or concentration of a certain substance or compound in a biological sample contained in a reaction mixture, such as a certain antigen or nucleic acid as mentioned above. To achieve this goal accurately, methods have been developed over the years, such as the widely known Polymerase Chain Reaction (PCR), for example in the form of a real-time PCR, digital PCR (dPCR) or multiplex PCR, which enable the in vitro synthesis of nucleic acids in a biological sample, through which a DNA segment can be specifically replicated, i.e. a cost-effective way to copy or amplify small segments of DNA or RNA in the sample. The development of these methods for amplifying DNA or RNA segments has generated enormous benefits in gene analysis as well as the diagnosis of many genetic diseases, or also in the detection of viral load.

In the course of a typical PCR conduct, a specific target nucleic acid is amplified by a series of reiterations of a cycle of steps in which nucleic acids present in the reaction mixture are (a) denatured at relatively high temperatures, for example at a denaturation temperature of more than 90° C., usually about 94-95° C., for separation of the double-stranded DNA, then (b) the reaction mixture is cooled down to a temperature at which short oligonucleotide primers bind to the single stranded target nucleic acid, for example at an annealing temperature of about 52-56° C. for primer binding at the separated DNA strands in order to provide templates (annealing), and, thereafter, (c) the primers are extended/elongated using a polymerase enzyme, for example at an extension temperature at about 72° C. for creation of new DNA strands, so that the original nucleic acid sequence has been replicated. Repeated cycles of denaturation, annealing and extension, usually about 25 to 30 repeated cycles, result in the exponential increase in the amount of target nucleic acid present in the sample, wherein the time for heating and cooling the samples has a significant influence on the overall process time.

Digital polymerase chain reaction (digital PCR, DigitalPCR, dPCR, or dePCR) is a biotechnological refinement of conventional polymerase chain reaction methods that can be used to directly quantify and clonally amplify nucleic acids strands including DNA, cDNA or RNA. The key difference between dPCR and PCR lies in the method of measuring nucleic acids amounts, with the former being a more precise method than PCR, though also more prone to error in the hands of inexperienced users. A "digital" measurement quantitatively and discretely measures a certain variable, whereas an "analog" measurement extrapolates certain measurements based on measured patterns. PCR carries out one reaction per single sample. dPCR also carries out a single reaction within a sample, however the sample is separated into a large number of partitions and the reaction is carried out in each partition individually. This separation allows a more reliable collection and sensitive measurement of nucleic acid amounts. The method has been demonstrated as useful for studying variations in gene sequences—such as copy number variants and point mutations—and it is routinely used for clonal amplification of samples for so called "next-generation sequencing". dPCR requires a multitude of test samples which have to be processed at different devices or machines in a laboratory.

Especially for samples used during dPCR, multiple plates or microplates have to be moved within the laboratory from one station to another. A possibility to handle these plates is to simply stack them and carry them without any packing. A big disadvantage of this possibility is that the plates can get contaminated during transport. Another disadvantage is that the stack of plates can easily be separated so that plates can either be lost or mixed up with stacks belonging to another test.

For sending samples over longer distances, e.g. via post services, transport packings exist, which protect the samples against contamination as well as against mechanical damage. Some of these transport packings are made of cardboard and are, therefore, cost-effective and lightweight. As an example, such a transport packing is disclosed in DE8715650U1 which shows a container made of cardboard and foamed plastic, with the container comprising different compartments to receive biological samples. The container as shown therein, however, can only receive a small number of samples. Furthermore, the container is complexly built to prevent the samples from being damaged during the planned transport by a post service. A similar transport packing is disclosed in DE202005001968U1, showing a mailing packing designed especially for shipping DNA containing samples, which packing is substantially made of cardboard. It is particularly designed to receive a small number of single sample containing vessels. The disclosed packing, however, is only designed for single vessels and can not be used receive and transport a large number of vessels, or also plates or microplates containing samples.

Therefore, the general need exists in the present technical field to provide a possibility to transport and handle a multitude of plates containing samples in a comfortable but safe and reliable way, especially within a laboratory.

SUMMARY OF THE INVENTION

The present invention addresses the above described problems of the known prior art and significantly improves the transport of a multitude of samples, in particular from one station in a laboratory to the next. According to a first aspect of the present invention, a foldable transport container for a stack of plates placed inside the transport container is provided, which comprises, in a folded state, the following components:

A bottom wall, a front wall and a back wall, which are linked to each other, and a top wall divided into at least two parts, with a first top wall part linked to the front wall and a second top wall part linked to the back wall. Here, the top wall provides a handle for carrying the transport container. The inventive transport container furthermore provides substantially open sides, wherein each of the front wall and the back wall comprises a flap on each of its lateral sides, with each flap being folded to a side of the transport container, and wherein each open side is at least partially covered by the respective folded flaps.

A foldable transport container according to the present invention can be used to transport multiple plates containing samples in a folded state. In such a folded state, the foldable transport container is completely assembled and ready for use. Such foldable transport container is initially produced as a flat strip of material which has to be transformed into the folded state before the use as a transport container. Such a strip of material as well as a method for transforming this strip into the folded state of the foldable transport container is further described later on as well. In the folded state, the foldable transport container is essentially shaped as a box with openings in its walls. Conveniently, the foldable transport container is made of cardboard, resulting in a transport container which is lightweight, foldable and cost-efficient. Of course, such a foldable transport container can also be made of other suitable sheet materials, e.g. sheets of plastic, metal, or a composition of different materials. Furthermore, a foldable transport container can also be made of a material that comprises a coating or lamination.

The inventive foldable transport container comprises, in the folded state, a bottom wall which limits the foldable transport container at its bottom side. The bottom wall is provided to carry plates of samples that can be stacked on top of the bottom wall. Respectively adjacent to the bottom wall are a front wall and a back wall. The front wall and the back wall are linked to the bottom wall on opposite sides thereof. In the folded state, each front wall and back wall is essentially orientated perpendicular to the bottom wall. During the use of the foldable transport container, the front wall and the back wall are provided to hold a stack of plates of samples in position, stacked on top of the bottom wall. Front wall and back wall limit the foldable transport container at two opposite sides. The foldable transport container as described herein furthermore comprises a top wall divided into at least two parts, i.e. a first top wall part and a second top wall part. The first top wall part is linked to the front wall, and the second top wall part is linked to the back wall. Thus, these top wall parts are linked to the front wall and the back wall on opposite sides in relation to the bottom wall. Therefore, the front wall extends from the bottom wall to the first top wall part and, thus, connects both. The back wall extends from the bottom wall to the second top wall part. The connection between front wall/back wall and the respective top wall part is designed in a flexible manner so that the top wall parts are foldable in relation to front wall and back wall. Also, the top wall provides a handle for carrying the foldable transport container. Part of such a handle can either be provided at the first top wall part, the second top wall part, or at both top wall parts. The top wall with its handle is designed in a way that it can be opened to load or unload plates with samples, and can be closed to protect and transport the samples within the foldable transport container.

The foldable transport container according to the present invention provides substantially open sides. “Substantially open sides” in this context means that, in the folded state, the bigger part of two sides of the container is open and not covered by material. The foldable transport container comprises a closed bottom wall. Linked to the bottom wall are the front wall and the back wall which are part of the lateral area of the box-shaped foldable transport container. The two sides which are substantially open sides extend between the front wall and the back wall and are also part of the lateral area. The two sides are arranged at those two opposite sides of the bottom wall which are not linked to the front wall and the back wall. The bottom wall is preferably shaped in a rectangular manner and comprises four edges, with one of those edges being linked to the front wall. The edge opposite to the edge linked to the front wall is again linked to the back wall. The two edges which are not linked to front or back wall are arranged at the substantially open sides of the foldable transport container in its folded state. Each of the front wall and the back wall comprises a flap on each of its lateral sides. In the folded state, these flaps are folded to a side of the transport container. In the folded state, the flaps are orientated parallel to those edges of the bottom wall, which are not linked with the front wall or the back wall. Further, in the folded state, the flaps are orientated rectangular to the bottom wall and rectangular to the front wall/the back wall. Thus, the substantially open sides of the foldable transport container are at least partially covered by the flaps. In the folded state, the flaps are folded to a side of the transport container. Therefore the front wall with its two flaps as well as the back wall with its two flaps form corners which keep sample plates stored inside the foldable transport container in their position.

A foldable transport container according to the present invention requires only little amount of material for holding and protecting a stack of plates of samples. The walls of such a foldable transport container can be made of thin sheet material such as cardboard or plastics. Therefore, a foldable transport container has low weight and is easy to handle and to carry. A foldable transport container can either be designed as a one-time consumable or, alternatively, as a product usable over a longer period of time. Designed as a consumable, the transport container can be made of cost-effective cardboard. When designed as a more durable product, the foldable transport container can be made of washable material which is also suitable for sterilization in an autoclave or the like. Such material can be e.g. a plastic material or cardboard coated or laminated with a foil e.g. a metal foil.

A foldable transport container according to the present invention encloses a stack of plates including samples in a way that the stack is safely kept together and can be carried without the danger of losing any plates. Still, the foldable transport container comprises two substantially open sides so that the user can see if, and if yes, how many plates are stored within the transport container. The two substantially open sides also achieve that less material for the transport container is required, compared to a design in which those sides are closed walls. Thus, the foldable transport container according to the present invention can be made of a small amount of sheet material, and, in the folded state, allows a safe transport and provides for its content to be visible to any observer, human or machine. The top wall is designed as a closed wall and, thus, protects the topmost plate and a stack of plates against contamination from above. The foldable transport container according to the present invention is produced as a strip of sheet material and, when needed, can be transformed into the folded state. For such transformation into the folded state, no additional materials such as glue or tape are required with the foldable transport container according to the present invention. The transport container can be transformed from a strip into the folded state simply by hand. Therefore, the foldable transport container according to the present invention is simple to assemble and easy to handle by a user.

According to a specific embodiment of the present invention, each open side is partially covered by the respective folded flaps for providing a central opening for access to the stack of plates from the outside of the transport container. Preferably, the central opening extends from the top wall to the bottom wall. The two substantially open sides between the front wall and the back wall are partially covered by the folded flaps. The folded flaps do not extend over the whole sides of the foldable transport container. Respectively, one flap linked to the front wall and one flap linked to the back wall provide a central opening between each other on the lateral sides of the transport container. Such central opening provides the user of the transport container access to the stack of plates inside the transport container. Furthermore, the content of the transport container is visible through the central opening between the folded flaps. Also, the central opening simplifies loading and unloading of the plates since the user can reach the plates through the central opening. To easily reach even the undermost plate in the transport container, the central opening preferably extends from the top wall to the bottom wall.

According to a specific embodiment of the present invention, each flap comprises a linked bottom latch and is connected to its opposing flap below the bottom wall by means of respectively opposing bottom latches. Here, the connection between opposing flaps can be established by form-fit engagement of the respectively opposing bottom latches. Further, each bottom latch can comprise a notch and matching opposing notches interlace in a crosswise manner. To improve the stability of the foldable transport container of the present invention in the folded state, each flap can comprise a bottom latch. Such a bottom latch is linked to a flap and can be connected to a bottom latch of the opposing flap. By this link, two flaps get connected with each other and are prevented from accidentally unfolding. The bottom latches are folded rectangularly to the flaps, resulting in the flaps extending parallel to the bottom wall. Preferably, the latches are folded underneath the bottom wall where they can be connected in an unobstructed manner. Such a connection is made between the bottom latches of two opposing flaps, both either linked to the front wall or to the back wall. The connected latches extend under the bottom wall adjacent to the front wall or the back wall. Two opposing bottom latches are preferably connected by form-fit engagement. For example, such a form-fit engagement can be realized by notches cut into the bottom latches. Such notches of two opposing bottom latches can be positioned on opposite sides of the respective latches, such that the two notches can be interlaced into each other to connect the opposing bottom latches via form-fit engagement.

According to a specific embodiment of the present invention, each of the first top wall part and the second top wall part comprises a slot, wherein an alignment of the slots establishes the handle for carrying the transport container. In this embodiment, both top wall parts each comprise a slot intended for serving as part of a handle for the foldable transport container. Such a slot can be shaped e.g. as a rectangle. In order to carry the transport container, the two slots of the first top wall part and the second top wall part are brought into alignment with each other, thereby establishing a handle. Since both top wall parts are part of the handle, it is insured that the foldable transport container does not open unintentionally or accidentally. A user carrying the transport container by the handle always holds both top wall parts at the same time and, therefore, lifts the transport container in a symmetrical manner. By establishing the handle by both parts of the top wall, it can also be insured that the top wall is closed above the stack of plates inside the transport container. Such a closed top wall prevents the content of the transport container from contamination from above.

According to a specific embodiment of the present invention, each flap on an upper end extends into a protrusion for providing guidance during an insertion of each plate into the transport container. Here, the protrusion can be provided in the form of a guiding wing. With such structure, each flap comprises a protrusion on an upper end. In the folded state, the flaps extend at the sides of the transport container. The protrusion on the upper end of the flaps protrudes from the flap neighboring the two parts of the top wall. The protrusion provides mechanical guidance during the insertion of plates into the transport container. The protrusion can be provided in the form of a guiding wing or an inclined insertion surface. Therefore the protrusion is orientated in an obtuse angle in relation to the flap in a way that the distance between two upper ends of opposing protrusions is bigger than the distance between two opposing flaps. With two opposing protrusions extending outwards from the sides of the transport container, there is open space between two opposing protrusions so that the two parts of the top wall can be folded unobstructedly towards each other, for closing the transport container.

According to a specific embodiment of the present invention, the plates are dPCR plates, such as 6 or 12 dPCR plates, stacked on top of each other. Here, the foldable transport container can be used particularly to receive dPCR plates. Each of these dPCR plates contains a multitude of vessels which can contain small amounts of liquid samples. In practice, stacks of 6 or of 12 of such dPCR plates turn out to be especially suitable for packing in one single foldable transport container. Of course, a foldable transport container can also be used for packing stacks comprising a different number of dPCR plates. Furthermore, a foldable transport container is also suitable to receive different types of sample containing plates, and is not limited to receiving solely dPCR plates.

According to a specific embodiment of the present invention, the transport container comprises at least one writable surface on its outer circumference. In this regard, the surface can be implemented in the form of a whiteboard material. Thus, the foldable transport container according to the present invention can provide a writable surface for labeling its content. Such labeling can make sure that different foldable transport containers can not be mixed up. Preferably, the writable surface is placed on its outer circumference where it can be read in an easy and comfortable manner. Such a writable surface can, for example, be implemented as a paperlike surface. Such a paperlike surface is cost-effective but can often only be used one-time for labeling. Another solution can be the implementation of the writable surface by means of whiteboard material. This solution has the advantage that any writing can simply be erased and be replaced by a new writing for further labeling. This solution is especially suitable for transport containers which are designed for multiple use.

In another optional embodiment of the present invention, the transport container comprises at least one identification code on its outer circumference, such as a barcode or the like. Such an identification code is readable by automatic scanners. With such an identification code, logistics within a laboratory can be simplified, since the position of a particular transport container is traceable in a comfortable and automated way.

In a further optional embodiment of the invention, the transport container comprises a magnet for Hall sensor application, preferably embedded in its bottom wall. Such a magnet can be used to identify a particular transport container. Also, such a magnet can be used to detect the orientation of a particular transport container, for example within a loading area of a laboratory machine. Another option is to provide a RFID transponder in or on one of the walls of the transport container. Such RFID transponder can be programmed with information belonging to one particular transport container or its content. The thus provided information can be read or written contact-free, i.e. in a wireless manner.

According to another specific embodiment of the present invention, the folded state of the transport container can be achieved without the use of an adhesive connection, such as by use of glue or tape. Thus, in this embodiment, the foldable transport container can be transformed into the folded state without the use of an adhesive connection. All necessary connections between the particular elements or components of the transport container can be made with form-fit engagements. By avoiding adhesive connections, the risk of contaminants sticking to adhesive material can be eliminated. Furthermore, adhesive connections are usually made only for one-time use and might not be disconnectable in order to transform the transport container back into its original shape as a flat strip. With avoiding such adhesive connections, a transport container currently not in use can be disassembled and stored conveniently in its very original unfolded state as a flat strip or sheet.

According to a specific embodiment of the present invention, in an unfolded state, the transport container consists of a strip of material provided in a flat manner, preferably in the form of a strip of cardboard or paper, further preferably pre-cut for establishing the later-to-be components of the foldable transport container. Here, the foldable transport container is initially produced as is flat strip of material. Such a flat strip of material can easily be processed automatically. The shape of the transport container can be pre-cut in this flat state. The links between different components of the transport container can further be stamped in order to make it easier to fold these links. A flat projection of the transport container can be produced by a common production line for packings. Therefore, production of such an inventive foldable transport container can be automated and, thus, is fast and cost efficient.

According to another specific embodiment of the transport container of the present invention in an unfolded state, the strip of material can comprise a coating suitable for sterilization, which can provide for re-usability of the foldable transport container, or the foldable transport container is for single use only. The properties of a foldable transport container can be influenced by providing a coating or lamination of the base material of which the transport container is made of. If the transport container is made of cardboard or paper, which is generally not water resistant per se, the base material can be coated with water resistant material. Thus, in a coated state, the base material gets more robust and can be re-used, cleaned and/or sterilized multiple times. Therefore, a coating or lamination is especially appropriate when using the foldable transport container more than once.

According to another specific embodiment of the present invention, the transport container of the present invention is for transportation inside a laboratory facility between instruments involved in the workflow of a respective assay. The foldable transport container can be suitable for transportation of plates or stack of plates containing samples between different instruments or machines within the laboratory. In many assays, a certain sequence of processing and testing steps has to be conducted. A foldable transport container according this specific embodiment is made for transportation of samples between one or more steps of a laboratory assay. Of course, foldable transport containers are also suitable for transporting samples with other applications in or outside a laboratory.

According to a second aspect of the present invention, a strip of material is provided, which strip of material is used for providing a foldable transport container as already described above. Such strip is linked together between the bottom wall and the front wall, and between the bottom wall and the back wall. The first top wall part is linked to the front wall, and the second top wall part is linked to the back wall, wherein each top wall part comprises a slot. Each of the front wall and the back wall comprises a flap linked on each of its lateral sides, and each flap comprises a linked bottom latch with a notch. Here, each flap extends on an upper end thereof into a wing-like protrusion, wherein the strip of material can comprise a coating suitable for sterilization, for re-usability of the strip of material. A strip of material according to the second aspect of the present invention constitutes a pre-stage to a foldable transport container according to the first aspect of the invention. Accordingly, the strip of material is a flat projection, or -speaking in mathematical terms—a developed view, of the foldable transport container. The inventive strip of material is designed to allow an easy transformation into a foldable transport container. In general, the inventive strip is flat-shaped and made of sheet material. Suitable materials for such a strip are, for example, cardboard or plastics. The strip contains all components needed for the transport container. These components are the walls for the container as well as auxiliary components such as flaps and protrusions. The strip comprises cuts between components which are separated from each other after transformation into the folded transport container. At other positions, the strip comprises links connecting components that are adjacent to each other after the transformation into the folded state. Since the strip of material is a pre-stage to the folded transport container, the terms used for the particular components of the strip of material and the folded transport container are the same. For example, the bottom wall of the transport container in a folded state is referred to as bottom wall in the pre-stage of the strip of material, and so on.

The central part of a strip according to the present invention is the bottom wall. This central part is linked to the front wall and to the back wall. The front wall and the back wall are connected with the bottom wall on opposing sides thereof. On the opposite side to the side with the link to the bottom wall, each the front wall and the back wall are linked to a part of the top wall. Both parts of the top wall comprise a slot in order to provide a handle in the folded state of transport container. Each of the front wall and the back wall comprises two flaps linked on the lateral sides thereof. These flaps are designed to cover a part of the sides of the transport container in a folded state. The links between the front wall/the back wall and the bottom wall are adjacent to the links between the front wall/the back wall and their flaps. The links are shaped in the form of a line. For transforming the strip of material into the folded transport container, the components are folded at these line-shaped links. The links between the front wall/the back wall with the bottom ball are orientated rectangular to the links of the front wall/the back wall with their flaps. All flaps are linked to a bottom latch. This link between flap and bottom latch is orientated parallel to the links between front wall respectively back wall with the bottom wall. The bottom latches are only linked to their respective flaps. There is no link between the bottom latches and the bottom wall. Each of the bottom latches comprises a pre-cut notch. These notches are designed to connect two opposing bottom latches during transformation of the strip into the transport container. The flaps are also linked to protrusions. These protrusions are arranged on the side of the flaps opposing the sides which are linked to the bottom latches. These protrusions are preferably shaped wing-like and are designed to assist the user to load plates of samples into the foldable transport container in a folded state.

Optionally, a strip of material according to a second aspect of the invention can comprise a coating or lamination, for example in order to protect the strip of material against environmental effects such as humidity, or also dirt or other contaminants.

According to a third aspect of the present invention, a method for assembling a foldable container according to the first aspect of the present invention as described above by means of a strip of material according to the second aspect of the present invention as described above is also provided. In further detail, the inventive method includes the step of folding the front wall and the back wall in a rectangular manner to the bottom wall and the step of folding the flaps to the sides of the container in a rectangular manner. Furthermore the method includes the step of folding the bottom latches of the flaps towards the underside of the bottom wall and interlacing opposing bottom latches with each other by means of the respective notch in a crosswise manner. Finally, the method also comprises the step of bringing the first top wall part and the second top wall part in contact with each other by folding the same towards each other, with the slots being aligning with each other. The method according to the present invention serves to transform a strip of material as described above into a transport container as also described above. Here, the method starts with a strip of material as an initial starting point and is preferably folded exactly in the sequence of steps as follows: Starting with the flat strip of material, the front wall and the back wall are folded around their respective links with the bottom wall. Folding is stopped when the front wall and the bank wall are orientated essentially rectangular to the bottom wall. Afterwards, the flaps of each front wall and back wall are folded around their links until the flaps are orientated essentially rectangular to the front wall/back wall. After folding, the flaps are positioned at the sides of the transport container and cover part thereof. To secure the flaps in the described position, the bottom latches of the flaps are folded towards the underside of the bottom wall where they are connected with each other. The connection is made by interlacing the notches of two opposing bottom latches with each other. After connecting the bottom latches, the flaps are fixed to each other. In order to assist loading of plates of samples into the transport container, the protrusions protruding at the upper ends of the flaps can be folded to the outside of the flaps respectively the outside of the transport container. Finally the two top wall parts, i.e. the first top wall part linked to the front wall and the second top wall part linked to the back wall, are folded in direction to each other until they come into contact with each other. After the two top wall parts are brought into contact with each other, the slots of both parts align with each other and together form a handle usable to carry the folded transport container. To load or unload the folded transport container, the two top wall parts can be folded back in a direction away from each other, in order to provide an opening.

According to a specific embodiment of the method according to the present invention, the method further includes the step of connecting the first top wall part and the second top wall part with each other, for example by means of at least one side shutter extending through the slots of the first top wall part and the second top wall part, by means of at least one top shutter extending through the slots of the first top wall part and the second top wall part, and/or by insertion of one top wall part into the other, and/or folding the wing-like protrusions of the flaps slightly towards the outside of the transport container. Here, the method comprises further steps to transform a strip of material into a foldable transport container in the folded state. In order to fix both top wall parts to each other, a first possibility is to connect the first top wall part with the second top wall part by means of at least one side shutter. Such a side shutter is inserted through both aligning slots of the two top wall parts. Also, such a side shutter is fixed in the position extending through both slots by folding it around the top wall area adjacent to the slots. The side shutter is placed at a lateral side of both top wall parts. For example, the side shutter can be made of cardboard. Alternatively, the side shutter can be made of metal foil which keeps its form after plastic deformation and, therefore, secures both top wall parts permanently to each other. Another possibility to connect the first top wall part to the second top wall part is to assemble a top shutter extending through both aligning slots. Such top shutter is fixed above the slots at the side of the slots opposing front wall respectively back wall. The top shutter can be designed in a similar way as the side shutter and can be made of the same materials. In order to fix both top wall parts to each other, the top shutter can be folded around an area of the top wall parts adjacent to the aligning slots. A third possibility to fix the two top wall parts to each other is to insert one top wall part into another. For this third possibility, an area of one top wall part is shaped in the way that it fits into the slot of the other opposite top wall part. Designed this way, one top wall part can be threaded into the other top wall part, in order to establish a form-fit engagement between these two top wall parts. This third possibility has the advantage that no other parts like a side shutter or a top shutter or the like are necessary to connect and fix both top wall parts to another. Of course, the three previously described possibilities of connecting the tour top wall parts can be combined with each other. In order to simplify loading of plates with samples into the folded transport container, the wing-like protrusions of the flaps can be folded slightly to the outside of the transport container in a direction away from the top wall parts. In this way, the wing-like protrusions provide inclined insertion surfaces which guide plates with samples into the interior of the transport container.

As used herein and also in the appended claims, the singular forms “a”, “an”, and “the” include plural reference unless the context clearly dictates otherwise. Similarly, the words “comprise”, “contain” and “encompass” are to be interpreted inclusively rather than exclusively; that is to say, in the sense of “including, but not limited to”. Similarly, the word “or” is intended to include “and” unless the context clearly indicates otherwise. The terms “plurality”, “multiple” or “multitude” refer to two or more, i.e. 2 or >2, with integer multiples, wherein the terms “single” or “sole” refer to one, i.e. =1. Furthermore, the term “at least one” is to be understood as one or more, i.e. 1 or >1, also with integer multiples. Accordingly, words using the singular or plural number also include the plural and singular number, respectively. Additionally, the words “herein,” “above,”, “previously” and “below” and words of similar import, when used in this application, shall refer to this application as a whole and not to any particular portions of the application.

Furthermore, certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate various specific embodiments of the present invention. As such, the specific modifications as discussed hereinafter are not to be construed as limitations on the scope of the present invention. It will be apparent to the person skilled in the art that various equivalents, changes, and modifications may be made without departing from the scope of the present invention, and it is thus to be understood that such equivalent embodiments are to be included herein. Further aspects and advantages of the present invention will become apparent from the following description of particular embodiments illustrated in the figures.

Reference(s) to “embodiment(s)” throughout the description which are not under the scope of the appended claims merely represent possible exemplary executions and are therefore not part of the present invention.

LIST OF REFERENCE NUMERALS

Figure 1:
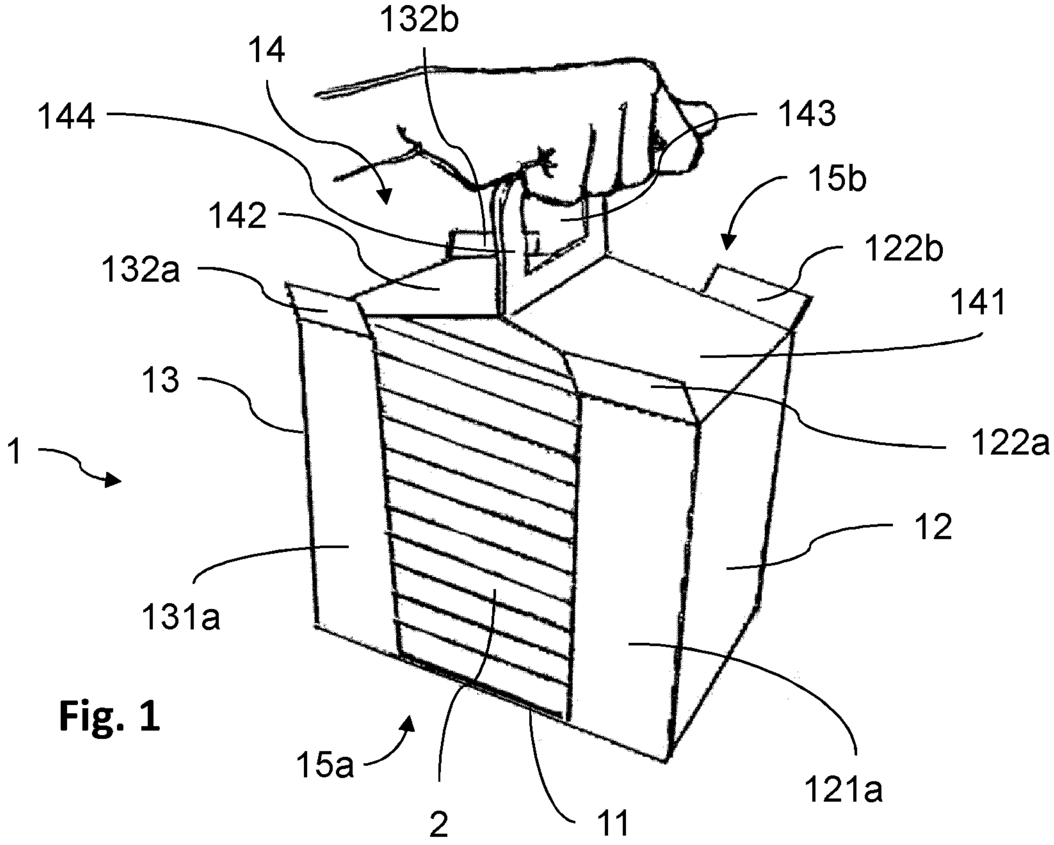
FIG. 1 is a conceptual perspective view of a foldable transport container according to an embodiment of the present invention, with the container accommodating multiple plates, and being held by a user’s hand.

1 foldable transport container
11 bottom wall 12 front wall
121*a*, 121*b* flap
122*a*, 122*b* protrusion
123*a*, 123*b* bottom latch
13 back wall
131*a*, 131*b* flap
132*a*, 132*b* protrusion
133*a*, 133*b* bottom latch
134 notch
14 top wall
141, 141' first top wall part
142, 142' second top wall part
143 slot
144 handle
145 side shutter
146 top shutter
147 insertion slot
15*a*, 15*b* side
2 plate
3 strip of material

DETAILED DESCRIPTION

Figure 3:
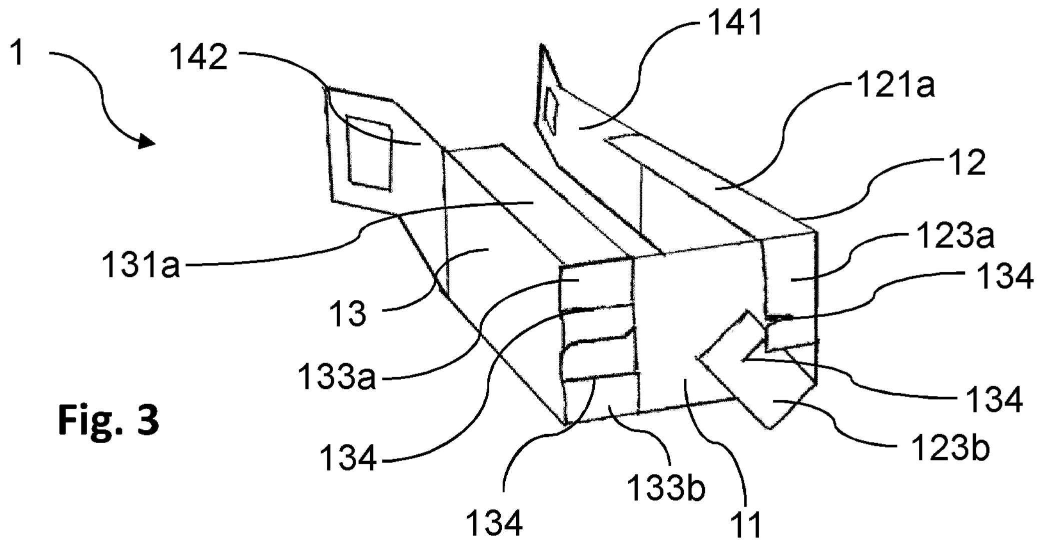
FIG. 3 is a conceptual perspective view of the foldable transport container of FIG. 1 during a step of a folding method according to an embodiment of the present invention.
Figure 4:
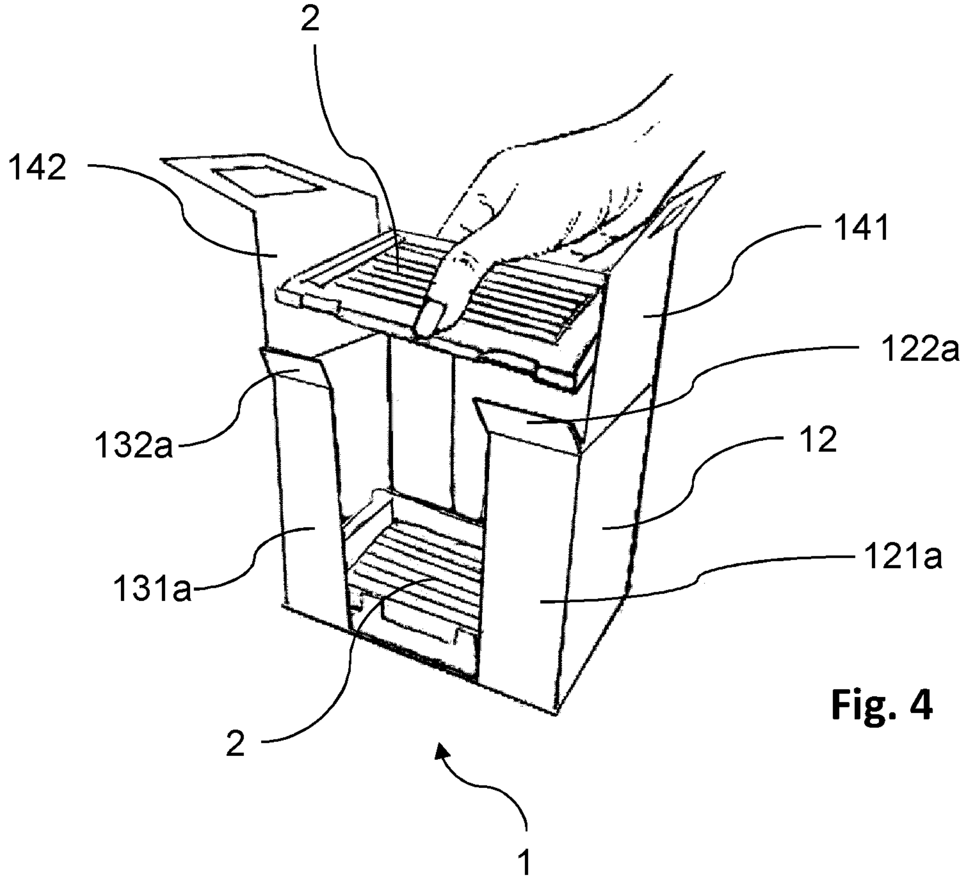
FIG. 4 is a conceptual perspective view of the foldable transport container of FIG. 1 during its loading with plates.

FIGS. 1, 3 and 4 each show a conceptual perspective view of a foldable transport container 1 according to an embodiment of the present invention. In FIG. 1, an embodiment of a foldable transport container 1 is illustrated in its folded state. As can be seen in FIG. 4, the folded transport container 1 can be loaded with a stack of plates 2 which contain samples, for example DNA samples for biological tests. The foldable transport container 1 can be used to transport the stack of plates 2 within a laboratory from one processing station to another. The foldable transport container 1 encloses the stack of plates 2 so that the plates 2 are protected from contamination during transport. The foldable transport container 1 comprises a handle 144 to carry the foldable transport container 1. In the folded state, the foldable transport container 1 is essentially shaped like a box with openings in its sides 15*a*, 15*b*.

The foldable transport container 1 comprises a bottom wall 11 which limits the foldable transport container 1 at its bottom side. The bottom wall 11 is not visible in the illustration in FIG. 1, but can be gathered in FIG. 3. Adjacent to the bottom wall 11 are a front wall 12 and a back wall 13, respectively. The font wall 11 and the back wall 12 are linked to the bottom wall on opposite sides thereof. In the folded state, each of the front wall 11 and the back wall 12 are essentially orientated perpendicular to the bottom wall 11. In the embodiment as shown in FIG. 1, front wall 11 and back wall 12 have the same shape and size. Front wall 11 and back wall 12 are essentially in contact with the plates 2 and keep them in a stacked position, stacked on top of the bottom wall 11. The foldable transport container 1 is limited at its upper side by a top wall 14 which is divided into a first top wall part 141 and a second top wall part 142. The first top wall part 141 is linked to the front wall 12 and the second top wall part 142 is linked to the back wall 13. The front wall 12 extends from the bottom wall 11 to the first top wall part 141 and connects both components. The back wall 13 extends from the bottom wall 11 to the second top wall part 142. The links between front wall 12/back wall 13 and the respective top wall parts 141, 142 are flexible, so that the top wall parts 141, 142 are foldable in relation to the front wall 12 and the back wall 13. The top wall 14 provides the handle 144 for carrying the foldable transport container 1. Both top wall parts 141, 142 each comprises a slot 143 intended for serving as part of the handle 144. The slots 143 have rectangular shape in the pictured embodiment. The two slots 143 of the first top wall part 141 and the second top wall part 142 are in alignment with each other and, thus, establish the handle 144 together with each other. The top wall 14 transfers the weight force of the plates 2 symmetrically to the handle 144. Since both top wall parts 141, 142 are part of the handle 144, it can be ensured that the foldable transport container 1 does not open accidentally during transport, i.e. during carrying the container 1 through a laboratory. As an option, it is possible to fixedly secure both top wall parts 141, 142 to each other. Here, possible solutions for such a fixing are exemplary shown in FIGS. 5*a*, *b*, *c*.

The two sides 15*a* and 15*b* of the foldable transport container 1 are designed as substantially open sides. The substantially open sides 15*a*, 15*b* each provides a central opening for access to the stack of plates 2 from the outside of the transport container 1. The central opening illustrated in FIG. 1 in the open side 15*a* extends from the top wall 14 to the bottom wall 11. Thus, the content of the transport container 1, i.e. the stacked plates 2, are visible through the central opening.

The bottom wall 11 is shaped rectangular and comprises four edges. One of those edges is linked to the front wall 12, as can be gathered from FIG. 2. The edge opposite to the edge linked to the front wall 12 is linked to the back wall 13. The two edges which are not linked to front wall 12 or back wall 13 are arranged at the substantially open sides 15*a*, 15*b*. Each of the front wall 12 and the back wall 13 comprises a flap 121*a*, 121*b*, 131*a*, 131*b* on each of its lateral sides. In the depicted folded state, these flaps 121*a*, 121*b*, 131*a*, 131*b* are folded to a respective side 15*a*, 15*b* of the transport container 1. The flaps 121*a*, 121*b*, 131*a*, 131*b* are orientated parallel to those edges of the bottom wall 11 which are not linked to the front wall 12 or the back wall 13. In the depicted state, the flaps 121*a*, 121*b*, 131*a*, 131*b* are orientated rectangular to the bottom wall 11 and rectangular to the front wall 12/the back wall 13. The sides 15*a*, 15*b* of the foldable transport container 1 are partially covered by the flaps 121*a*, 121*b*, 131*a*, 131*b*. The front wall 12 with its two flaps 121*a*, 121*b* as well as the back wall 13 with its two flaps 131*a*, 131*b* form corners which keep the plates 2 in their stacked position. The two flaps 121*a*, 121*b* of the front wall 12 and the two flaps 131*a*, 131*b* of the back wall 13 are respectively connected to each other by means of bottom latches 123*a*, 123*b*, 133*a*, 133*b*. These bottom latches 123*a*, 123*b*, 133*a*, 133*b*, in a connected state, are positioned beneath the bottom wall 11 in the folded state of the container 1 and are, therefore, not visible in FIG. 1. The bottom latches 123*a*, 123*b*, 133*a*, 133*b* are shown in FIG. 3, depicted at a stage when the bottom latch 133*a* is already connected to the bottom latch 133*b*, and during the process of connecting the bottom latch 123*a* with the bottom latch 123*b*. Also shown in FIG. 3 are the two flaps 121*a*, 121*b* extending at their upper ends into the protrusions 122*a*, 122*b* for providing guidance during insertion of plates 2 into the transport container 1, see also FIG. 4. The two flaps 131*a*, 131*b* extend at their upper ends into the protrusions 132*a*, 132*b* in an analog way. The working principle of the protrusions 122*a*, 122*b*, 132*a*, 132*b* is illustrated in FIG. 4.

Figure 2:
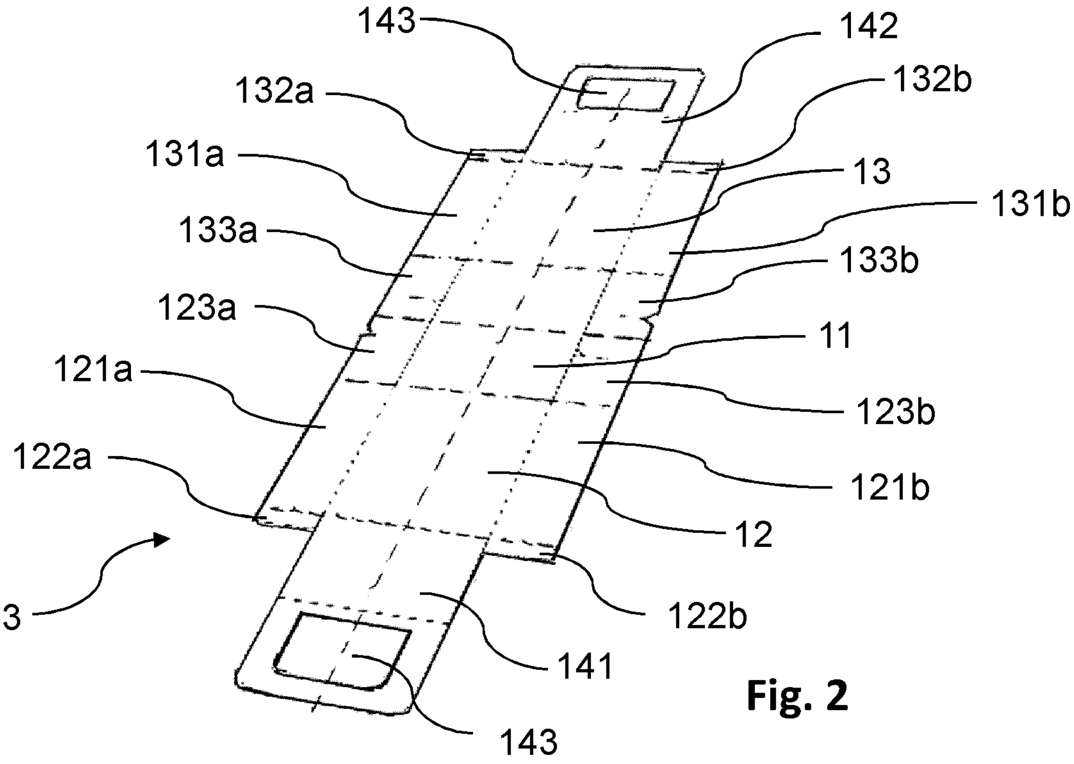
FIG. 2 is a conceptual perspective view of a strip of material for providing the foldable transport container as depicted in FIG. 1.

FIG. 2 shows a conceptual perspective view of a strip of material 3 for providing the foldable transport container 1 as shown in FIGS. 1, 3 and 4. The strip of material 3 as shown in FIG. 2 constitutes an initial pre-stage state of the foldable transport container 1 illustrated in FIGS. 1, 3 and 4. This strip of material 3 is a flat projection of the foldable transport container 1. The strip of material 3 consists of flat sheet material, for example cardboard. The strip of material 3 comprises cuts between components which are separated from each other after transformation into the transport container 1. In other positions, the strip of material 3 comprises links connecting components that are adjacent to each other after transformation into transport container 1.

In the following, the terms and reference numerals describing the components of the strip of material 3 are the same as used for the corresponding components of the transport container 1 in the folded state.

The central part of the shown strip of material 3 is the bottom wall 11. The bottom wall 11 is linked to the front wall 12 and the back wall 13. The front wall 12 is arranged adjacent to the bottom wall 11 and is directed towards the viewer in FIG. 2. The back wall 13 is arranged adjacent to the bottom wall 11 on the opposite side to the front wall 12. The front wall 12 is further linked to the first top wall part 141. The first top wall part 141 is linked to the front wall 12 opposing to the link between the front wall 12 and the bottom wall 11. In the same way, the second top wall part 142 is linked to the back wall 13 opposing to the link between back wall 13 and bottom wall 11. Each of the first top wall part 141 and the second top wall part 142 comprises a slot 143, which is cut out of the strip of material 3.

Each of the front wall 12 and the back wall 13 further comprises two flaps 121*a* and 121*b*, and 131*a* and 131*b*. The flaps 121*a*, 121*b* are linked to the lateral sides of the front wall 12. The flaps 131*a*, 131*b* are linked to the lateral sides of the back wall 13. The link between the front wall 12 and the bottom wall 11 is orientated in a rectangular manner in view of the links between the front wall 12 and its flaps 121*a*, 121*b*. Similarly, the link between the back wall 13 and the bottom wall 11 is orientated in a rectangular manner in view of the links between the back wall 13 and its flaps 131*a*, 131*b*.

All flaps 121*a*, 121*b*, 131*a*, 131*b* are each linked to a bottom latch 123*a*, 123*b*, 133*a*, 133*b* and to a protrusion 122*a*, 122*b*, 132*a*, 132*b*. In the following, these links are described exemplarily for the flap 121*a*, and this description applies in an analog way for the other flaps 121*b*, 131*a*, 131*b* and their respective bottom latches 123*b*, 133*a*, 133*b* and protrusions 122*b*, 132*a*, 132*b*.

The link between the flap 121*a* and bottom latch 123*a* is orientated parallel to the links between the front wall 12/the back wall 13 with the bottom wall 11. In the embodiment as illustrated in FIG. 2, the link between the flap 121*a* and bottom latch 123*a* has the shape of a line and is orientated collinear to the link between the front wall 12 and the bottom wall 11. The bottom latch 123*a* is solely linked to the flap 121*a*. There is no link between the bottom latch 123*a* and the bottom wall 11. The bottom latch 123*a* comprises a pre-cut notch which is not visible in FIG. 2. The flap 121*a* is further linked to the protrusion 122*a*. The protrusion 122*a* is arranged on the side of the flap 121*a* opposing the side which is linked to the bottom latch 123*a*. The link between the flap 121*a* and the protrusion 122*a* has the shape of a line and is orientated parallel to the link between the front wall 12 at the bottom wall 11. The link between the flap 121*a* and the protrusion 122*a* is arranged collinear to the link between the front wall 12 and the first top wall part 141.

All the links between the components of the strip of material 3 can be stamped, meaning that the thickness of the strip of material 3 is reduced in an area of these links. Such a stamping of the links makes it easier for the user to fold the components around these links during the transformation of the strip of material 3 into the transport container 1.

FIG. 3 shows a conceptual perspective view of a foldable transport container 1 according to an embodiment of the present invention during a particular folding step of the folding method of the present invention. In particular, FIG. 3 shows a state during folding a strip of material 3 according to FIG. 2 into a transport container 1 in its folded state as illustrated in FIG. 1. In FIG. 3, the bottom wall 11 is visible and directed to the viewer. Beneath the bottom wall 11 are the bottom latches 123*a*, 123*b*, 133*a*, 133*b*. On the left-hand side of the bottom wall lithe two bottom latches 133*a*, 133*b* of the back wall 13 have already been connected with each other. On the right-hand side of the bottom wall 11 the bottom latch 123*a* has already been folded and is orientated parallel to the bottom wall 11. The bottom latch 123*b* is in the state of folding. Each of the bottom latches 123*a*, 123*b* comprises a notch 134. To connect the bottom latches 123*a*, 123*b* with each other, their two notches 134 are in the start position to be interlaced. Starting from the illustrated position, the two notches 134 will next be moved into each other until they are interlaced. The two bottom latches 133*a* and 133*b* on the left-hand side of the bottom wall 11 are already in such an interlaced position.

FIG. 4 shows a conceptual perspective view of a foldable transport container 1 according to an embodiment of the present invention during loading with plates 2. FIG. 4 shows the foldable transport container 1 of FIG. 1. In the state illustrated in FIG. 4, the first top wall part 141 and the second top wall part 142 have been folded away from each other so that there is an opening between them. Through this opening, plates 2 are loaded into the interior of the foldable transport container 1. A first one of plates 2 has already been loaded and is positioned on top of the bottom wall 11. In the illustrated state, a user loads a second one of plates 2 into the foldable transport container 1. The loading of the second plate 2 is guided by the protrusions 122*a*, 122*b*, 132*a*, 132*b*. These protrusions 122*a*, 122*b*, 132*a*, 132*b* have been folded towards the outside of the foldable transport container 1. The protrusions 122*a*, 122*b*, 132*a*, 132*b* in the illustrated embodiment work like guiding wings during insertion of the plates 2 into the interior of the container 1.

Figure 5:
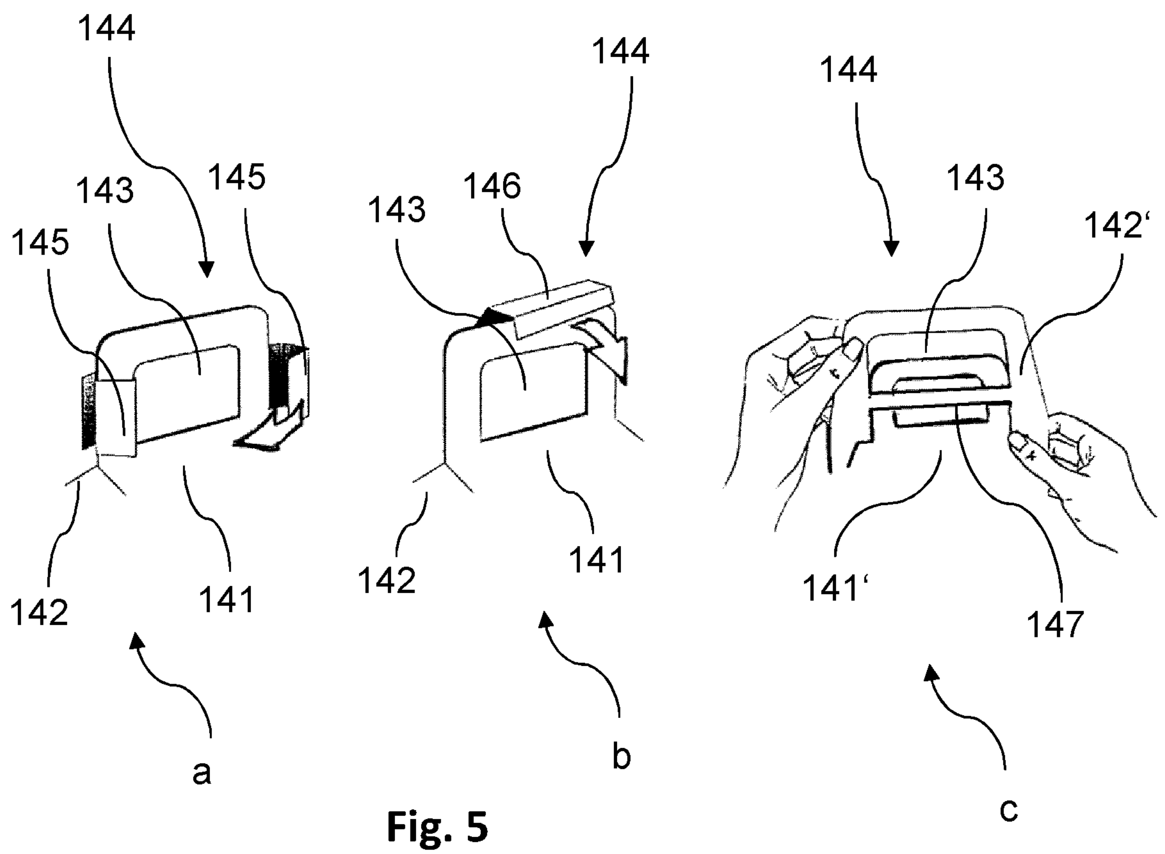
FIGS. 5*a, b, c* show conceptual perspective views of three solutions to connect two top wall parts of a foldable transport container according to an embodiment of the present invention.

FIGS. 5*a*, *b*, *c* show conceptual perspective views of three different solutions a, b, c for connecting two top wall parts 141, 142 of a foldable transport container 1 according to different embodiments of the present invention. These possibilities a, b, c can be realized separate or in combination with each other.

With solution a as shown in FIG. 5*a*, the lateral sides of the handle 144 are enclosed by two side shutters 145. These side shutters 145 are folded around the area neighboring the slots 143. To transport the foldable transport container 1, the side shutters 145 are wrapped around the handle 144 as shown by the arrow. To open the foldable transport container 1, the side shutters 145 can easily be disconnected/unfolded.

With solution b as shown in FIG. 5*b*, a top shutter 146 is folded around the area above the slots 143 of the handle 144. The working principle of the top shutter 146 is the same as the working principle of the side shutters 145 in FIG. 5*a*. To transport the foldable transport container 1, the top shutter 146 is wrapped around the handle 144 as shown by the arrow. To open the foldable transport container 1, the top shutter 146 can easily be disconnected/unfolded.

With solution c as shown in FIG. 5*c*, the shape of the upper area of the first top wall part 141' differs from the shape of the upper area of the second top wall part 142' in that the upper area around the slot 143 of the first top wall part 141' is smaller than the upper area around the slot 143 of the second top wall part 142'. The second top wall part 142' comprises an insertion slot 147 which is arranged next to the slot 143. As shown in FIG. 5*c*, the upper area of the first top wall part 141' is inserted through the insertion slot 147 of the second top wall part 142'. Thus, the upper part of the first top wall part 141' penetrates the second top wall part 142'. Such penetration creates a form-fit engagement between the two top wall parts 141' and 142' which secures both parts to each other. In the state as illustrated in FIG. 5*c*, the insertion of the first top wall part 141' through the insertion slot 147 is not yet finished. Starting from the illustrated state, the first top wall part 141' is further moved until both upper edges of the first top wall part 141' and 142' match. In this matching state, the two slots 143 are aligned with each other, and, in this matching state, the two upper areas of the two top wall parts 141' and 142' establish a handle 144 that can be used to carry the transport container 1.

While the current invention has been described in relation to its specific embodiments, it is to be understood that this description is for illustrative purposes only. Accordingly, it is intended that the invention be limited only by the scope of the claims appended hereto.

The invention claimed is:

1. A foldable transport container for a stack of plates placed inside the transport container, with the transport container comprising in a folded state the following components:

a bottom wall, a front wall and a back wall linked to each other;

a top wall divided into at least two parts, with a first top wall part linked to the front wall and a second top wall part linked to the back wall, the top wall providing a handle for carrying the transport container; and substantially open sides, wherein each of the front wall and the back wall comprises a flap on each of its lateral sides, with each flap being folded to a side of the transport container, and wherein each open side is at least partially covered by the respective folded flaps, further wherein each flap comprises a linked bottom latch and is connected to its opposing flap below the bottom wall by means of respectively opposing bottom latches, wherein the connection between opposing flaps is established by form-fit engagement of the respectively opposing bottom latches, further wherein each bottom latch comprises a notch and matching opposing notches interlace in a crosswise manner.

2. The foldable transport container according to claim 1, wherein each open side is partially covered by the respective folded flaps for providing a central opening for access to the stack of plates from the outside of the transport container, preferably wherein the central opening extends from the top wall to the bottom wall.

3. The foldable transport container according to claim 1, wherein the first top wall part and the second top wall part each comprises a slot, and wherein an alignment of the slots establishes the handle for carrying the transport container.

4. The foldable transport container according to claim 3, wherein the first top wall part and the second top wall part are connectable with each other by means of at least one side shutter extending through the slots of the first top wall part and the second top wall part, by means of at least one top shutter extending through the slots of the first top wall part and the second top wall part, and/or by insertion of one top wall part into the other.

5. The foldable transport container according to claim 1, wherein the plates comprise at least 6 dPCR plates, stacked on top of each other.

6. The foldable transport container according to claim 1, wherein the transport container comprises at least one writable surface on its outer circumference, wherein the surface is implemented by means of a whiteboard material;

the transport container comprises at least one identification code on its outer circumference; and the transport container comprises a magnet for Hall sensor application, embedded in its bottom wall.

7. The foldable transport container according to claim 1, wherein the folded state of the transport container is achieved without the use of an adhesive connection.

8. The foldable transport container according to any one of the preceding claims, wherein, in an unfolded state, the transport container consists of a strip of material provided in a flat manner, in the form of a strip of cardboard or paper, pre-cut for providing the components of the foldable transport container.

9. The foldable transport container according to claim 8, wherein the strip of material comprises a coating suitable for sterilization, for re-usability of the foldable transport container, or the foldable transport container is for single use only.

10. The foldable transport container according to claim 1, wherein the transport container is provided for transportation inside a laboratory facility between instruments involved in a workflow of a respective assay.

11. A strip of material for providing a foldable transport container according to claim 1, wherein the strip is linked together between the bottom wall and the front wall, and between the bottom wall and the back wall, the first top wall part is linked to the front wall, the second top wall part is linked to the back wall, each top wall part comprises a slot, each of the front wall and the back wall comprises a flap linked on each of its lateral sides, each flap comprises a linked bottom latch with a notch, and each flap extends on an upper end thereof into a wing-like protrusion, wherein the strip of material comprises a coating suitable for sterilization for re-usability of the strip of material.

12. A method for assembling a foldable container according to claim 1 by means of a strip of material according to claim 11, including the steps of:

folding the front wall and the back wall in an rectangular manner to the bottom wall, folding the flaps to the sides of the container in a rectangular manner, folding the bottom latches of the flaps towards the underside of the bottom wall, interlacing opposing bottom latches with each other by means of the respective notch in a crosswise manner, and bringing the first top wall part and the second top wall part in contact with each other by folding the same towards each other, with the slots being aligning with each other.

13. The method according to claim 12, further including the step of:

connecting the first top wall part and the second top wall part with each other, by means of at least one side shutter extending through the slots of the first top wall part and the second top wall part, by means of at least one top shutter extending through the slots of the first top wall part and the second top wall part, and/or by insertion of one top wall part into the other, and/or folding the wing-like protrusions of the flaps slightly towards the outside of the transport container.

14. A foldable transport container for a stack of plates placed inside the transport container, with the transport container comprising in a folded state the following components:

a bottom wall, a front wall and a back wall linked to each other;

a top wall divided into at least two parts, with a first top wall part linked to the front wall and a second top wall part linked to the back wall, the top wall providing a handle for carrying the transport container; and substantially open sides, wherein each of the front wall and the back wall comprises a flap on each of its lateral sides, with each flap being folded to a side of the transport container, and wherein each open side is at least partially covered by the respective folded flaps, wherein each flap on an upper end extends into a protrusion for providing guidance during an insertion of each plate into the transport container, wherein the protrusion is provided in the form of a guiding wing.

* * * * *